United States Patent [19]
Bachtel et al.

[11] Patent Number: 5,603,904
[45] Date of Patent: Feb. 18, 1997

[54] APPARATUS FOR CATALYST REPLACEMENT

[75] Inventors: Robert W. Bachtel, El Cerrito, Calif.; Yoshitomo Ohara; Toshio Ishizuka, both of Tokyo, Japan; Tsunehiko Hiraga, Hokkaido, Japan; Krishniah Parimi, Concord, Calif.; David E. Earls, Pinole, Calif.

[73] Assignee: Chevron U.S.A. Inc., San Francisco, Calif.

[21] Appl. No.: 624,195

[22] Filed: Mar. 28, 1996

Related U.S. Application Data

[63] Continuation of Ser. No. 357,969, Dec. 16, 1994, abandoned, which is a continuation-in-part of Ser. No. 261,594, Jun. 17, 1994, Pat. No. 5,527,512.

[30] Foreign Application Priority Data

Jun. 18, 1993 [JP] Japan ................................. 5-172510

[51] Int. Cl.$^6$ ............................................. B01J 8/18
[52] U.S. Cl. ........................... 422/143; 422/220; 422/311
[58] Field of Search .............................. 422/143, 145, 422/176, 220, 238, 311; 502/439, 134; 208/143, 157

[56] References Cited

U.S. PATENT DOCUMENTS

| | | | |
|---|---|---|---|
| 3,197,288 | 7/1965 | Johanson | 208/143 |
| 3,208,833 | 9/1965 | Carson | 422/220 |
| 3,336,217 | 8/1967 | Meaux | 208/143 |
| 3,410,791 | 11/1968 | Perry et al. | 208/143 |
| 3,410,792 | 11/1968 | Perry et al. | 208/143 |
| 3,523,888 | 8/1970 | Stewart et al. | 208/157 |
| 3,723,072 | 3/1973 | Carson et al. | |
| 3,829,983 | 8/1974 | White | 34/583 |
| 4,312,741 | 1/1982 | Jacquin | 518/706 |
| 4,392,943 | 7/1983 | Euzen et al. | 208/152 |
| 4,444,653 | 4/1984 | Euzen et al. | 208/152 |
| 4,571,326 | 2/1986 | Bischoff et al. | 422/207 |
| 4,591,428 | 5/1986 | Pronk | 208/165 |
| 4,639,354 | 1/1987 | Bischoff et al. | 422/140 |
| 4,738,770 | 4/1988 | Hastings et al. | 208/152 |
| 4,879,958 | 11/1989 | Allen et al. | 110/245 |
| 4,968,409 | 11/1990 | Smith | 208/157 |
| 5,076,908 | 12/1991 | Stangeland et al. | 208/148 |
| 5,098,230 | 3/1992 | Scheueman | 406/143 |
| 5,302,357 | 4/1994 | Kramer et al. | 422/219 |

*Primary Examiner*—Christopher Kim
*Attorney, Agent, or Firm*—A. W. Klaassen; A. S. Zavell

[57] ABSTRACT

A light-weight and easily manufacturable catalyst support structure is provided, which allows fluid flow into a catalyst bed in uniform distribution. The support structure is formed in a cone-like shape in which the diameter enlarges upward. The support structure comprises a shell-like support member, a first mesh layer comprising thick mesh elements, and a second mesh layer having a mesh size which does not allow catalytic particulates to pass through. The first mesh layer overlays the support member, and the second mesh layer overlays the first mesh layer. The shell-like support member includes a circular bottom plate extending perpendicular to the center line of the reactor, and a side wall having a truncated cone shape which extends upward from the edge of the bottom plate. The bottom plate and the side wall are primarily made of perforated plates through which the fluid passes. A plurality of cylindrical flow guides of different diameters are provided underneath the shell-like support member.

21 Claims, 7 Drawing Sheets

APPARATUS FOR CATALYST REPLACEMENT

CROSS-REFERENCE TO RELATED APPLICATION

This application is a continuation of application Ser. No. 08/357,969, filed Dec. 16, 1994, abandoned, which application is a continuation in part application of U.S. application Ser. No. 08/261,594, filed Jun. 17, 1994, U.S. Pat. No. 5,527,512, the entire disclosure of which is incorporated herein by reference. Priority is also claimed for this application under 35 U.S.C. §119 based upon Japanese patent application 5-172510 filed Jun. 18, 1993.

FIELD OF THE INVENTION

The present Invention relates to an apparatus and method for on-stream catalyst replacement during hydroprocessing of a hydrocarbon feed stream.

More particularly, the present invention provides for an improved apparatus and method for hydroprocessing of a hydrocarbon feed stream through a hydroprocessing vessel and for economically utilizing space within the hydroprocessing vessel over a wide range of processing rates without substantial fluidization or ebulation of a descending packed bed of catalyst during high counterflow rates of the hydrocarbon feed and a hydrogen containing gas through the catalyst bed.

BACKGROUND OF THE INVENTION

Hydroprocessing or hydrotreatment to remove undesirable components from hydrocarbon feed streams is a well-known method of catalytically treating such heavy hydrocarbons to increase their commercial value. "Heavy" hydrocarbon liquid streams, and particularly reduced crude oils, petroleum residual tar sand bitumen, shale oil or liquified coal or reclaimed oil, generally contain product contaminants, such as sulfur, and/or nitrogen, metals and organo-metallic compounds that tend to deactivate catalyst particles during contact by the feed stream and hydrogen under hydroprocessing conditions. Such hydroprocessing conditions are normally in the range of 212° F. to 1200° F. (100° to 650° C.) at pressures of from 20 to 300 atmospheres. Generally such hydroprocessing is in the presence of catalyst containing Group VI or VIII metals such as platinum, molybdenum, tungsten, nickel, cobalt, etc., in combination with various other oxide particles of alumina, silica, magnesia and so forth having a high surface to volume ratio. More specifically, catalyst utilized for hydrodemetalation, hydrodesulfurization, hydrodenitrification, hydrocracking etc., of heavy oils and the like are generally made up of a carrier or base material; such as alumina, silica, silica-alumina, or possibly, crystalline aluminosilicate, with one or more promoter(s) or catalytically active metal(s) (or compound(s)) plus trace materials. Typical catalytically active metals utilized are cobalt, molybdenum, nickel and tungsten; however, other metals or compounds could be selected dependent on the application.

The packed bed of hydroprocessing catalyst in contact with upward-flowing fluid charge, such as a hydrocarbon feed and a hydrogen-containing gas, is generally supported by the catalyst support structure which serves both to support the packed bed of catalysts and to aid in achieving a uniform distribution of upflowing fluid into the catalyst bed. Failure to achieve an adequate distribution of fluid into the bed may lead to rapid catalyst deactivation or the formation of solid deposits in the catalyst bed.

A number of solutions have been proposed for improving the distribution of liquid and gaseous reactants into a catalyst bed.

U.S. Pat. No 3,336,217 to Meaux teaches a method for intermittently withdrawing catalyst from the bed of a high pressure and temperature reactor, in which the catalyst is supported in the bed on a conventional bubble cap tray or other suitable means. Additional disclosures of a perforated catalyst partition having bubble caps include U.S. Pat. Nos. 3,197,288; 3,410,791; 3,410,792; 3,523,888 and 4,738,770.

U.S. Pat. No. 4,312,741 to Jacquin teaches a catalytic process for conversion of hydrocarbons or bituminous shales or carbon monoxide in the liquid phase in contact with upward flowing hydrogen. The reactor used in the process includes one or more stages, at the bottom of each being a perforated support with multiple openings having a cross-section of a size smaller than the catalyst particle and at least one opening of a cross-section substantially larger than the catalyst particles. A fluid (hydrocarbon and/or hydrogen) is injected upward through the large opening to prevent rapid flow of catalyst through the opening. Catalyst may be removed from the reactor by stopping the fluid flow and allowing catalyst to fall through the support.

U.S. Pat. No. 4,392,943 to Euzen, et al. teaches a process for catalytic treatment of hydrocarbon in the presence of hydrogen where the catalyst is introduced at the top of a reactor vessel and withdrawn from the bottom, countercurrent with the hydrocarbon which is introduced at the bottom and discharged from the top. Catalyst discharge occurs through a flared funnel within the reactor. The funnel allows for the upward flow of hydrocarbon through perforations of a size sufficiently small to prevent passage of the catalyst downward through the perforations. Hydrocarbon is injected into the reactor through a delivery tube having orifices located either above and/or below the cone.

U.S. Pat. No. 4,444,653 to Euzen et al. teaches a process for withdrawing granulated solid particles from and introducing fluid into a reactor having a flared zone for withdrawing catalyst and a pipe system for injecting fluid above the walls of the flared zone. The flared zone is a continuous (i.e. free of roughness and of any openings) structure having the shape of an overturned cone or pyramid whose apex is oriented downward. The angle of the cone axis with one of the cone generatrices is between 10° and 80°, and preferably between 30° and 40°. The pipe system for injecting fluids into the reactor may include a series of pipes connected at one end and radiating out along the funnel, arranged as the ribs of an overturned umbrella. The cross-sectional area of the different injection tubes in the pipe system are designed to eliminate vapor-liquid phase separation. The perforations or slots in the injection tubes are preferentially oriented downwards to avoid their clogging with catalyst particles.

U.S. Pat. No. 4,571,326 to Bischoff et al. teaches an apparatus for withdrawing solid particles and introducing a fluid charge into the contact zone of a reactor. As part of the apparatus, a withdrawing funnel of inverted conical pyramidal shape is included in the reactor. The withdrawing funnel is provided with perforations or slots distributed over its surface, with the size of the perforations being small enough to prevent passage of catalyst particles while permitting the passage of an ascending stream of fluid. To avoid the migration of reactant gas below the upper part of the funnel, the gas is caused to pass through parallel paths, which oblige the gas particles to follow a controlled path below the funnels.

U.S. Pat. No. 4,639,354 to Bischoff et al. teaches a horizontal tray having regularly spaced openings, each of a sufficiently small size to prevent solid particles from passing through but of sufficient size to give access to an ascending stream of fluid charge and hydrogen.

U.S. Pat. No. 4,968,409 to Smith describes a feed distribution system for selectively upgrading a feed stream of hydrocarbon fluid containing metallic components which counterflow into a descending bed of catalyst particles. The system includes a reactor vessel and an inclined surface, such as a conical support member, for the descending bed of catalyst particles. Gas distribution to the bottom of the inclined surface is through a plurality of holes formed at different elevations, so that gas flow into the bed is substantially uniform, independent of hole elevation or elevation of liquid feed tubes interconnecting a common liquid reservoir to the catalyst bed through the inclined surface. Thus, uniform dispersion of both the gaseous components and the liquid hydrocarbonaceous components is maintained into the descending bed of catalyst particles. Desirably, the conical surface is disposed so that the apex extends downwardly relative to the feed.

U.S. Pat. No. 5,076,908 to Stangeland, et al. teaches continuously supplying replacement catalyst to a downwardly flowing catalyst bed in a hydrocarbon feed stream upflowing at a rate controlled to prevent substantial ebulation of the catalyst particles forming the packed bed. The conventional catalyst support structure, as taught in Stangeland et al. (U.S. Pat. No. 5,076,908), is a beam-supported structure. This structure includes a series of annular polygons, approaching the form of annular rings, formed by a plurality of segment plates extending from an imperforate center plate to the sidewall of the reactor vessel, and radial spoke support members extending between the segment plates. This assembly supports a conical, or pyramidal, perforated plate or screen, which is permeable to both gas and liquid rising from the lower portion of the reactor vessel. With this particular structure, the mixture of the hydrocarbon liquid feed and hydrogen gas entering the bed separates by gravity into radially alternate gas and liquid rings, made up of adjacent segments between each pair or radial spokes. Thus, both phases flow upwardly through alternate concentric annular passages under the screen.

However, in the conventional catalyst support structure taught in U.S. Pat. No. 5,076,908, the weight and size of the beams in the structure increase dramatically as reactor size increases. The increased weight and size both increases the complexity and cost of fabrication and installation, and tend to hinder fluid from being uniformly distributed into the catalyst bed.

While a number of solutions have been proposed to improve the distribution of upflowing fluids into a catalyst bed, none have been completely satisfactory. Therefore, it is a particular object of this invention to provide a catalyst support structure for the improved distribution of upflowing fluid components into a downflowing catalyst reaction bed.

It Is a further object of this invention is to provide a catalyst support structure having improved capabilities for uniformly distributing hydrogen-containing gas and a liquid feedstock into a bed or layer of catalytic particulates. It is a further object of this invention to provide a catalyst support structure which facilitates removal of catalyst from a catalytic reactor.

It is a further object of the invention to provide an easily manufacturable and light-weight support structure suitable for supporting a moving catalyst bed in a large diameter reactor, while introducing fluid into the catalyst bed in a uniform distribution.

SUMMARY OF THE INVENTION

Accordingly, the present invention provides a catalyst support structure for use in a substantially cylindrically-shaped reactor containing a catalyst bed comprising:

a. a perforated conical support member diverging upwardly and having a truncated conical shape truncated by a bottom plate; and b. at least one upper flow guide abutting said conical support member and extending upwardly and having a height above the conical support member sufficient to direct fluid flow upwardly into said catalyst bed.

The catalyst support structure, for supporting a moving bed of catalytic particulates within a cylindrically-shaped reactor, is particularly suited to reactor systems operating with an upflowing fluid charge. For this purpose, the conical support member is provided with perforations or slots, distributed substantially uniformly over its surface, of sufficient size to permit the passage of an ascending fluid charge, and small enough to prevent passage of catalytic particulates through the conical support member. This may be accomplished by providing that the holes or perforations through the conical support member be sufficiently small to prevent the flow of catalyst, but sufficiently large to minimize pressure drop at a preselected fluid flow through the conical support member.

In an alternative embodiment, the perforations in the conical support member are sized and spaced to minimize the pressure drop for fluid flow. Since the perforations in this embodiment are usually larger than the catalytic particulates, the preferred conical support member is overlaid with a means for preventing the passage of catalytic particulates through the conical support member.

The catalyst support structure in a preferred embodiment further comprises a plurality of substantially concentric, cylindrical lower flow guides abutting the lower surface of the conical support member and extending downwardly. The lower flow guides are radially spaced apart from each other to form a plurality of concentric annular rings, and each is coaxial with the bottom plate.

Among other factors, the present invention is based on the discovery that the distribution of an upflowing fluid charge into a catalyst bed in a moving bed catalytic reactor system is improved when the catalyst bed is supported on a conical catalyst support which is provided with lower flow guides to form a plurality of concentric annular rings, and with upper flow guides to direct fluid flow upwardly into said moving catalytic bed in said reactor.

BRIEF DESCRIPTION OF THE DRAWINGS

FIG. 1–3 and 5–8 relate to embodiments of the present invention, while FIG. 4 relates to Stangeland, et al., U.S. Pat. No. 5,076,908.

FIG. 1 is a sectional drawing showing the support structure of this invention in a plane along the centerline of the reactor.

FIG. 2 is a sectional drawing of the support structure in line 2—2 of FIG. 1, excluding the lower flow guides.

FIG. 3 is an enlarged sectional drawing of a flow guide.

FIG. 5 and 6a through 6c illustrate a non-woven catalyst support screen of the present invention.

FIG. 7 is a sectional drawing of an embodiment of the support structure in line 2—2 of FIG. 1, showing the catalyst support screen of FIGS. 5 and 6a–6c on the catalyst support member.

FIG. 8 is a sectional drawing of another embodiment of the catalyst support structure in lines 2—2 of FIG. 1, showing a number of woven mesh screen members separated by upper flow guides.

DETAILED DESCRIPTION OF THE INVENTION

Figure 1:
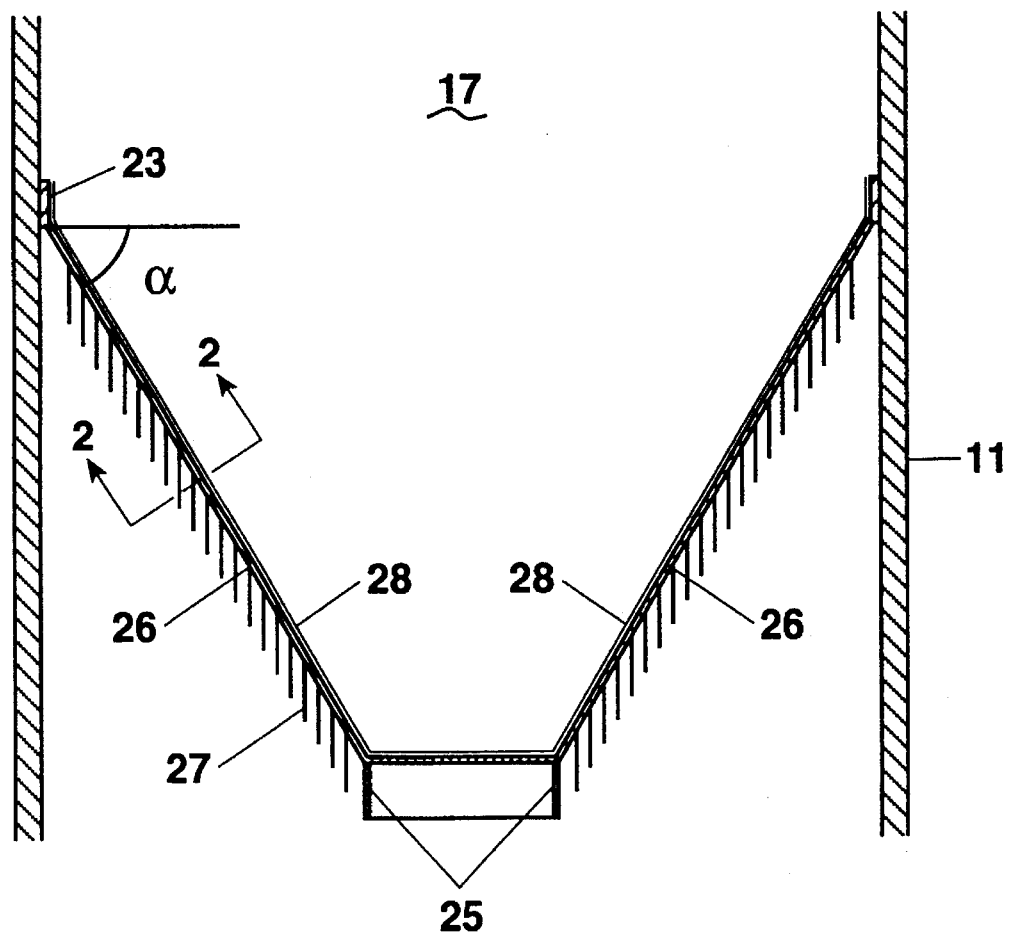

The present invention is directed to a structure for supporting a bed of catalytic particulates within a catalytic reactor. The structure of the present invention comprises at least three elements: a conical support member, at least one upper flow guide and a bottom plate. Preferably, the structure of the present invention will also contain at least one screen member and one lower flow guide. The various elements of the structure and their function are hereinafter described in more detail. The present structure provides for an improved distribution of fluid reactants into the catalyst bed, and is cheaper to manufacture than conventional beamed catalyst support structures. The catalyst support structure of the present invention comprises:

a. a perforated conical support member diverging upwardly and having a truncated conical shape truncated by a bottom plate; and b. at least one upper flow guide abutting said conical support member and extending upwardly and having a height above the conical support member sufficient to direct fluid flow upwardly into said catalyst bed.

The truncated cone is of an inverted cone shape, having the apex at the lowest point and diverging upward from its apex, the cone being truncated by a plane perpendicular to the axis of the cone and above the apex. Preferably, the conical support member is a perforated plate. Using a conical support member, made using a shaped metal plate having perforations distributed over its surface, to support the catalyst bed greatly reduces the weight of the support structure relative to the weight of conventional beam-supported structures. Fabricating the plate into a truncated cone of the present invention and connecting the cone to a reactor body in the field is a relatively easy operation. Uniformly distributed holes in the conical support member of the present invention provide a support structure which introduces reactant fluids into the catalyst bed in a more uniform manner over the whole sectional area of the catalyst bed compared with using conventional beam-supported structures. Furthermore, since the diameter and the pitch of each hole may be varied according to its specific location catalyst support structure of the present invention, the distribution pattern of the fluid flow can be adjusted easily. The resulting uniform contact between the fluid and the catalyst, and the associated reduced pressure drop, as provided by the support structure, increases reaction efficiency. Thus, process advantages of the present invention includes improved distribution of reactants into the catalyst bed, reduced pressure drop for flow across the support structure, reduced weight of the support structure, ease of fabrication, and reduced costs.

A typical catalyst support structure of this invention, for a reactor having an inside diameter in the range of between about 1.5 meters and about 10 meters will weigh from about 1.2 to about 57 metric tons. More preferably, the reactor will have an inside diameter in the range of between about 3 meters to about 7 meters, and the catalyst support structure will preferably weigh between about 5 to about 28 metric tons. Generally, the weight of the catalyst in the reactor which is supported by the catalyst support structure of the present invention will be in the range of 11 to 3500 metric tons and preferably 50 to 600 and more preferably 100 to 400 metric tons. As previously discussed, one desires a catalyst support structure having a minimum weight commensurate with a given reactor diameter, catalyst load, and desired fluid rate through the structure.

The thickness of the perforated plate forming the conical support member can be calculated in accordance with known membrane stress calculation formulas, based on the catalyst weight load to be supported. The diameter, the pitch, and the number of the holes are determined based on the allowable pressure drop for the reacting gas and the reacting liquid flowing through the support structure, particle sizes of the catalyst, and the weight of the catalyst bed. The materials of the plate members are determined by considering corrosion caused by reacting gas and reacting liquid, reaction temperature, etc.

Typically, the perforated plate forming the conical support member has a thickness of between 5 mm and 50 mm, preferably between 10 mm and 40 mm. Using a perforated plate having varying thickness between the bottom of the cone and the top of the cone is also within the scope of the present invention. While the perforations in the perforated plate may be of an arbitrary shape, circular holes are generally chosen for reasons of ease of manufacture. The holes forming the perforations in the perforated plate are typically in the range of between 6 mm and 150 mm in diameter, preferably in the range of 8 and 100 mm in diameter, and more preferably in the range of 10 to 75 mm in diameter. For applications in which a screen or other such means for preventing the passage of catalytic particulates through the conical support member is not used, the preferred perforated plate will have holes or perforations smaller than the particulate catalyst used. Generally the holes will be less than 10 mm, preferably less than 8 mm, and more preferably less than 6 mm in diameter. The pitch of the perforations in the perforated plate are between 1.01 and 50, preferably between 1.05 and 20 and more preferably between 1.10 and 10 times the diameter of the holes in the perforated plate.

The preferred catalyst support structure comprises a conical support member which is overlaid with a means for preventing the passage of catalytic particulates through the conical support member. Suitable preventing means will typically take the form of a screen. Such screens can be either woven or non-woven. Overlapping metal bars or rods, either welded or otherwise fastened together, form an example of a non-woven screen. In order to provide sufficient strength for supporting the catalyst bed while preventing the passage of catalytic particulates through the conical support member, it may be desired to use a plurality of screen layers.

As an example of the use of at least two screen layers, the catalyst support structure comprises a first woven mesh layer overlaying the conical support member and a second woven mesh layer overlaying the first woven mesh layer. While the two woven mesh layers may have the same specifications and provide substantially the same function, it is preferred that the second woven mesh layer have openings small enough to prevent passage of catalytic particulates. It is further preferred that the opening areas of the first woven mesh layer overlaying the conical support member be larger than the opening area of each hole in the conical support member, and that the diameter of the wire elements of which the first woven mesh layer is constructed is thick enough to support the catalyst weight over each of the holes. The second woven mesh layer is provided to prevent catalytic particulates from dropping downward though the support structure, and the first wire woven mesh layer is provided to reinforce the second mesh layer and to support the catalyst weight over the opening area of each hole. The mesh elements for the first and second wire mesh layers are not necessarily of metal wire netting or mesh, but may be replaced by any material performing the same function as wire netting, for example perforated plates.

A woven mesh useful in the present invention will comprise metal wire netting, with wire diameter generally in the range of 0.1 to 10 mm, preferably in the range of 0.5 to 8 mm, and more preferably in the range of 0.5 to 3 mm. Openings between the wires will generally be less than 5 mm in the largest dimension, and preferably less than 3 mm in the largest dimension. In applications using a first woven mesh layer and a second woven mesh layer, the second woven mesh layer will have the physical properties of the mesh described above, ie. with wire diameter generally in the range of 0.1 to 10 mm, preferably in the range of 0.5 to 8 mm, and more preferably in the range of 0.5 to 3 mm, and with openings between the wires being generally less than 5 mm in the largest dimension, and preferably less than 3 mm in the largest dimension. The first woven mesh layer will comprise wires having a diameter in the range of 0.1 to 50 mm, more preferably in the range of 1 to 20 mm, with openings between wires of 1 to 100 mm, and preferably 2 to 50 mm.

A screen or perforated plate comprising a plurality of longitudinal rod members spaced transversely upon bearing rod members to provide slots having widths of a size to prevent passage of catalytic particulates through said screen is also useful for the catalyst support structure. An example of a screen of this type is described, for example, in U.S. Pat. No. 3,723,072, the entire disclosure of which is incorporated herein by reference.

The lower flow guides are substantially concentric, cylindrical baffles abutting the lower surface of the conical support member and extending downwardly, to provide that fluid coming from the lower portion of the reactor is introduced uniformly into the catalyst bed. In the absence of flow guides, fluid tends to flow outwardly (toward the reactor walls) under the conical support member of the support structure and then upwardly at high velocity along the reactor walls. In the present catalyst support structure, the conical support member (or equivalently the shell-like support member) is provided with lower flow guides in the form of, for example, plates or baffles, at locations under the support member to give a uniform flow distribution, while avoiding the holes in the shell-like support member. Consequently, a distribution pattern of fluid entering into the catalyst bed can be easily adjusted by proper positioning of the flow guides. Preferably, the cylindrical lower flow guides are radially spaced apart from each other from between 10 mm and 1000 mm, more preferably from between 50 mm and 750 mm, to form with the conical support member a plurality of concentric reservoir rings, each of the lower flow guides being coaxial with the central portion. More preferably, the lower flow guides are of substantially equal vertical lengths, typically less than 1000 mm in length, and usually within the range of 50 mm and 1000 mm in length.

The present catalyst support structure comprises at least one upper flow guide abutting the conical support member. Each upper flow guide extends upwardly from an upper surface of the conical support member and has a height above the conical support member sufficient to reduce fluid flow along the upper surface of the conical support member, and to direct fluid flow upwardly into said moving catalytic bed in said reactor. While not wishing to be bound by any theoretical interpretation, commercial experience with catalytic reaction systems operating with an upflowing fluid charge suggests that conventional catalyst support structures suffer from poor distribution of gaseous reactants, including hydrogen, into the catalyst bed. One source of the maldistribution is the tendency of the gaseous reactants which have passed through the conical support structure to migrate outwardly along the surface of the support structure to the outer reactor wall rather than flowing directly upwardly into the catalyst bed. The problem appears to be of particular concern when the conical support member is overlaid with one or more screens. The support structure of the present invention provides at least one upper flow guide, fixed to the upper surface of the conical support member, to reduce the migration of the gaseous reactants along the upper surface. Each upper flow guide is a raised element forming a continuous structure concentric to the bottom plate of the conical support member. Each upper flow guide may take one of many forms, Including baffles, extrusions, welds, or undulations in the conical support member, and more than one form may be used with a single catalyst support structure. A preferred upper flow guide is one or more weld patterns, each forming a continuous weld string, which attaches the screen member to the conical support member. The dimensions of the upper flow guide will depend on the type of material used. For example, a weld useful as an upper flow guide will typically vary in height from between about 5 mm and 50 mm, while a baffle will typically vary in height from between about 5 mm and 250 mm.

Reference in the following description will be made primarily to a fluid charge upflowing through the catalyst support structure, and through the catalyst bed supported thereon. The term "upflowing" refers to upward flow in relation to a horizontal plane, but is not limited to a vertical flow direction which is normal to the horizontal plane. As used herein, a "moving bed" catalytic reaction zone is one from which catalyst is removed, and to which catalyst is added, during the course of a reaction and at reaction conditions, such that catalyst moves downward in the reaction zone during catalyst removal.

The fluid charge, comprising a liquid component and/or a vapor (or gaseous) component, includes liquids such a hydrocarbon liquid and vapors such as a hydrogen-containing gas. As used herein, "catalyst" and "catalytic particulates" refers to particles which interact with a fluid charge, such as particles added to facilitate the reaction, sorbents or other fluid contact bodies.

Figure 7:
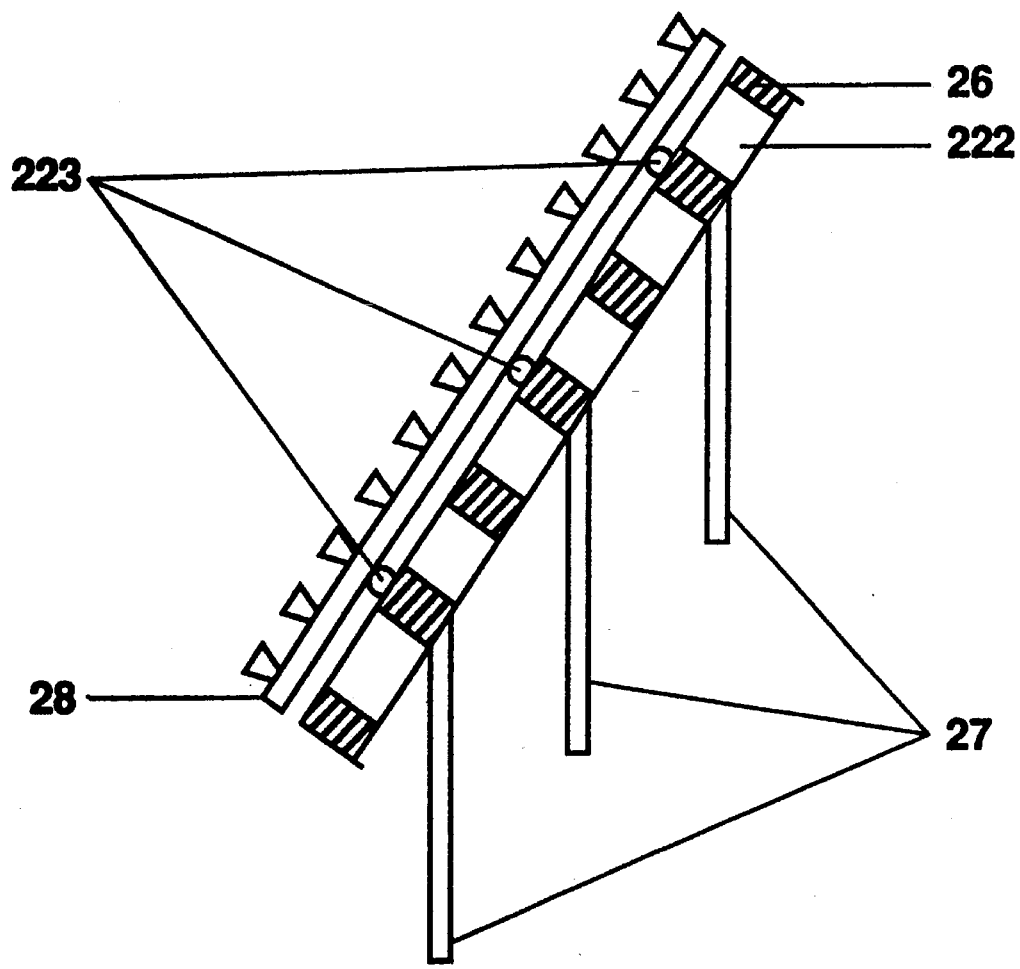
Figure 8:
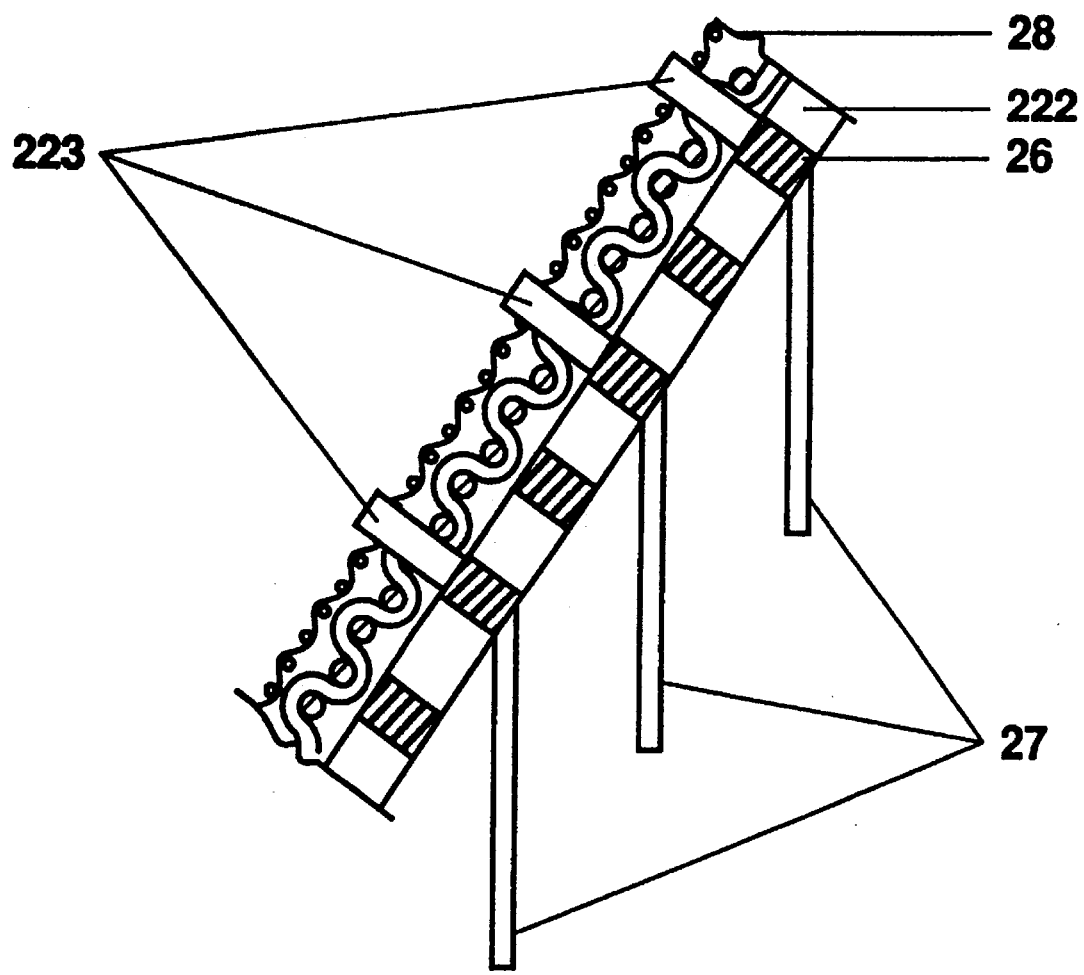

The structure of the present invention comprises at least three elements: a conical support member 26, at least one upper flow guide 223 and a bottom plate 25. Preferably, the structure of the present invention will also contain at least one screen member 28 and one lower flow guide 27. These elements are illustrated in FIGS. 1 and 2, with the exception of the upper flow guide, which is shown in FIGS. 7 and 8.

Figure 2:
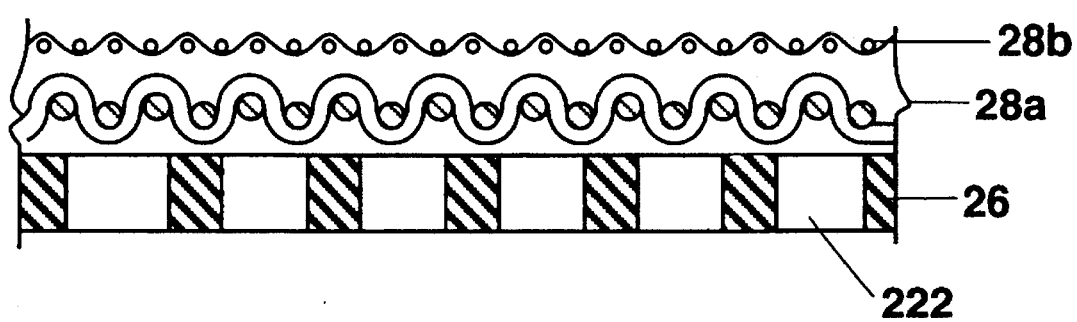
Figure 3:
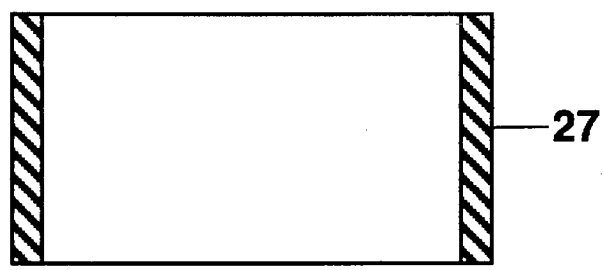

Referring now to FIGS. 1 and 2, the catalyst support structure comprises a truncated conical support member 26, having a diameter which enlarges upwardly toward the top of reactor vessel 11, and a central portion, shown as bottom plate 25, located in the center of conical support member 26, namely, the lowest position of the support structure, and extending perpendicular to the centerline of reactor vessel 11. Conical support member 26 is preferably a perforated plate pierced by a multiplicity of holes. The holes may be of any shape or size; for reasons of ease of manufacture, cylindrical holes are preferred. The size of the holes and the number of holes depends on the desired fluid flow rate through the catalyst support structure, and is particular to each particular structure and set of operating conditions within the reactor. For example, fluid flow rates through the conical support member on the order of from about 0.05 ft/sec to about 5.0 ft/sec would be suitable for a catalyst support structure of this invention.

The thickness of the perforated plate 26 can be calculated in accordance with known membrane stress calculation formulas, based on the catalyst weight load to be supported. Holes 222 through plate 26 are preferably spaced on a uniform pitch. The total opening area of the holes 222 is determined based on the allowable pressure drop for a fluid charge entering the catalyst bed through the catalyst support structure. The conical support member 26 and the bottom plate 25 may not necessarily have holes 222 of the same pitch or of the same diameter. For example, holes 222 may be provided in different diameters and different pitches depending on location on the support structure.

Conical support member 26 is shaped as a truncated cone such that angle α, the angle between the generating line of the truncated-cone and the diameter of the reactor, is larger than the angle of repose of catalytic particulates, to facilitate the flow of catalyst during catalyst withdrawal. Typically, angle α ranges from about 40° to about 80°, preferably from about 50° to about 70°, more preferably from about 55° to about 65°, still more preferably from about 58° to about 62°.

Bottom plate 25, having a substantially circular shape, is positioned perpendicular to the center line of the reactor, and is connected to the edges of the lower portion of conical support member 26. The bottom plate will generally be between 300 mm and 5,000 mm diameter and preferably between 500 mm and 3,000 mm diameter.

Bottom plate 25 may be either perforated or imperforate. It is preferred that the bottom plate 25 be imperforate (ie. no openings)in the portion beneath inlet 30 to a catalyst withdrawal conduit 29 (shown in FIG. 4), thereby preventing unreacted fluids from passing into conduit 29 during catalyst withdrawal. If bottom plate 25 has perforated portions, the perforations or holes are preferably of a size sufficient to permit the passage of catalytic particulates through the bottom plate. When the perforations are of such a size, they are overlaid by a means for preventing the passage of catalytic particulates through the bottom plate, such as a screen.

The conical support member 26 is overlaid by at least one screen member 28. The perforations in the conical support member 26 are sufficiently large to allow for the passage of a fluid charge through the conical support member and the bottom plate. While the perforations may be smaller than the catalytic particulates, thereby preventing flow of catalytic particulates through the conical support, it is preferred that the perforations be of a size, at least in one dimension, several times larger than that of the catalytic particulates. In this preferred embodiment the conical support member 26 is overlaid with at least one screen member 28. While it will be clear to the skilled practitioner that the type of screen member employed is not critical, at least one screen member will have perforations of a size to prevent passage of catalytic particulates through the screen but permit passage of a fluid charge. In the specific embodiment shown in FIG. 2, a woven mesh layer 28a overlays the conical support member 26 and at least the perforated portion of bottom plate 25. The first mesh layer 28a is made of wire mesh with a comparatively large mesh size woven using thick metal wires. The second wire mesh layer 28b is made of wire mesh with a slightly smaller mesh size than the particle size of the catalyst. The second wire mesh layer 28b is provided to prevent catalytic particulates from dropping downward through the support structure, and the first mesh layer 28a is provided to reinforce the second mesh layer 28b.

It is preferred that the opening areas of the first woven mesh layer overlaying the holes of the plate members be larger than the opening area of each hole, and that the diameter of the wire elements be thick enough to support the catalyst weight over each of the holes. The woven mesh elements for the first and second wire layers are not necessarily of metal wire netting, but may be replaced by any material performing the same function as wire netting, for example perforated plates or parallel rods having a cross-sectional width at the widest dimension of between about 0.5 mm and about 125 mm.

Figure 5:
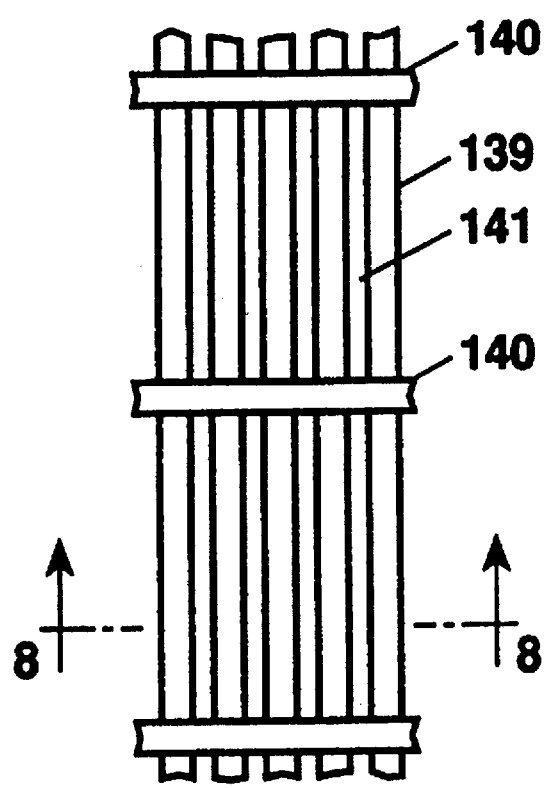

In a preferred embodiment, shown in FIG. 1, 5 and 6a–6c, the upper surface of conical support member 26 may be overlaid by one or more perforated screens constructed by spacing a plurality of longitudinal rod members 139 transversely upon bearing rod members 140, spaced apart sufficiently to provide a plurality of slot openings, typically of width between 0.01 mm to 10 mm, preferably between 0.2 mm and 8 mm. In this preferred embodiment, the longitudinal rod members and the bearing rod members are generally welded together. Referring now to FIG. 5, there is shown in plain view a portion of screen 28 of FIG. 1. A plurality of longitudinal rod members 139 are supported upon and attached to a plurality of bearing rod members 140 in a manner sufficient to provide a slot opening 141 between adjacent longitudinal rod members 139. The longitudinal rod members 139 are spaced apart so that slot opening 141 will allow passage of fluids while preventing the passage of catalyst particulates. For the catalyst support structure, longitudinal rod members 139 and bearing rod members 140 will have a cross-sectional width, measured at the widest cross section, in the region of between about 0.5 mm and about 5 mm. While FIG. 5 shows the longitudinal rod members 139 aligned perpendicular to the bearing rod members 140, those skilled in the art will realize that the bearing rod members 140 could have a radial alignment so that the longitudinal rod member 139 would be attached transversely to the bearing rod member 140, but not perpendicular thereto. The screen described in this paragraph is commonly known to those skilled in the art as a welded screen. A specific example of a welded screen which is commercially available is known as a "Johnson screen".

Figure 6A:
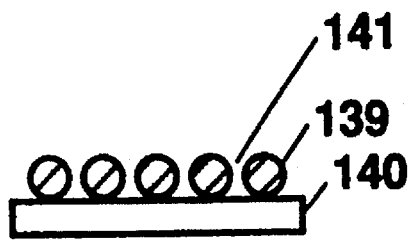
Figure 6B:
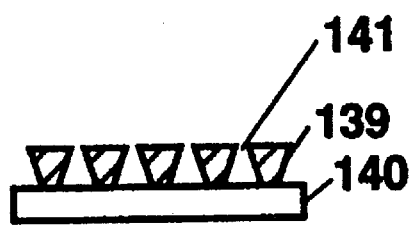
Figure 6C:
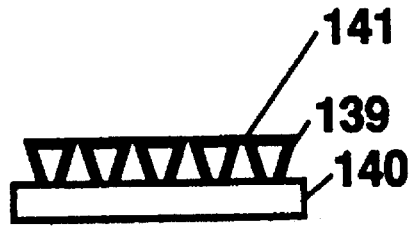

FIGS. 6a through 6c illustrate sectional views of the screen illustrated in FIG. 5 taken along the section line 8—8. In FIG. 6a, adjacent longitudinal rod members 139 have a circular cross-section. FIG. 6b illustrates a longitudinal rod member 139 having a solid trapezoidal cross-section. FIG. 6c illustrates a longitudinal rod member 139 having a channel type cross-section.

A plurality of concentric, substantially cylindrical lower flow guides 27 of different diameters abut the lower or underneath surface of conical support member Preferably, the centerline of each lower flow guide is coincidental with the centerline of the vertical reactor wall 12. Alternatively, lower flow guides 27 are concentric about bottom plate 25. Lower flow guides 27 direct the fluid coming from the bottom of the reactor into the catalyst bed in uniform distribution through the support structure, which is connected with the body of reactor 11 by reinforcing ring 23.

The particular merit of the lower flow guides 27 is that with each guide 27 extending axially parallel to sidewall 12 of vessel 11, the mixture of the hydrocarbon liquid feed and hydrogen gas entering the bed separates by gravity into radially alternate gas and liquid rings. Thus, both phases flow upwardly through alternate concentric annular passages through conical support member 26. The preferential separation of gas from liquid in each ring includes an annular cap segment of gas overlying an adjacent lower annular segment filled with liquid. Hence, both fluids have equal, and annularly adjacent, access to the bed through support member 26 and screen member 28. The plurality of alternate annular reservoir rings of hydrogen gas and hydrocarbon liquid assure even and equal feed of both phases across the full cross-sectional area of the catalyst support structure into bed 10. Among other factors, we have particularly found that this configuration insures even and equal distribution across the full cross-sectional area of the catalyst bed. Such equal distribution across the full diameter of the bed 10 permits a quiescent flow section to form directly above bottom plate 25 which truncates conical support member 26. This decreases substantially potential local ebulation or eddy currents from being induced in the catalyst bed at the point of catalyst withdrawal through inlet 30 of inverted J-tube 29 to assure localized laminar flow of catalyst and liquid from within bed 10.

Referring now to FIGS. 1, 7 and 8, a plurality of upper flow guides 223 also abut and rise above the upper surface of the conical support member, to reduce or to eliminate the migration of the fluid charge, primarily hydrogen-containing gas, along the upper surface of the conical support member and within and beneath screen 28 and upward along the outer, vertical reactor wall 12. In the embodiment shown in FIG. 7, the upper flow guides 223 are raised metal welds which form a circular pattern on the upper surface of the conical support structure. Preferably, the welds form a continuous, generally circular bond between the upper surface of the conical support member and the screen, such as the screen of FIGS. 5 and 6a–6c. Additional bonds or welds may be attached to the exposed edges of the screen to further reduce fluid migration along the screen. The upper flow guide 223 shown in FIG. 8 is a baffle, concentric to bottom plate 25, extending upward from the upper surface of the conical support member. The upper flow guides 223 shown in FIG. 8 are separated by a portion of screen 28, which forms a ring-like cover over perforations 222.

Figure 4:
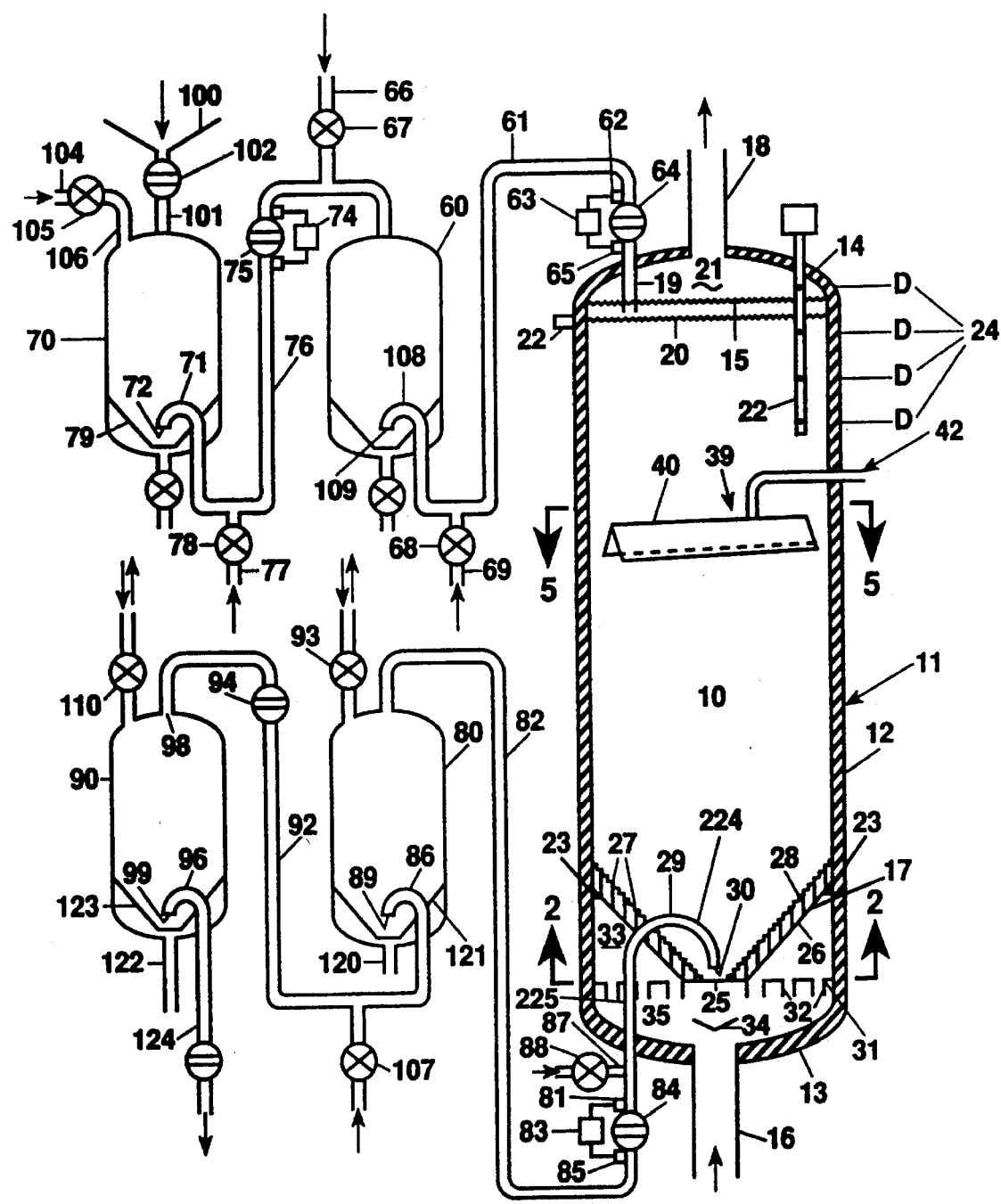
FIG. 4 is a schematic view of a conventional hydroprocessing reactor and accompanying vessels utilized in on-stream catalyst replacement during plug-like flow of catalyst with up-flowing liquid hydrocarbon feed and gas streams.

FIG. 4 illustrates a specific hydroprocessing system in which the present catalyst support structure may be used. Vessel 11, as indicated by the thickness of its cylindrical side wall 12 and domed closure heads, or ends, 13 and 14, is designed to react a hydrogen containing gas mixed with a liquid hydrocarbon stream at reaction conditions. Such reaction gas and a feed stream of hydrocarbon liquids are preferably premixed and introduced as a single stream through bottom head 13 by line 16.

To assure maximum catalytic benefit during the hydroprocessing of the hydrocarbon feed stream and the hydrogen-containing gas, it is essential that vessel 11 contain as much catalyst as possible within the design volume of vessel 11. Accordingly as indicated, catalyst support structure for bed 10 is placed as low as possible in vessel 11 while assuring full and adequate dispersion of the hydrogen phase within the liquid hydrocarbon stream. At the same time, the upper limit of bed 10 is near the top of domed head 14, while providing adequate space 21 for disengaging any entrained catalyst from the resulting products withdrawn through center pipe 18. To insure that catalyst is not entrained into product fluids exiting through center pipe 18, a screen 15 may be installed in space 21 above bed surface 20.

Fresh catalyst is then added to surface 20 through pipe 19 extending through screen 15. The upper level of bed 10 is preferably controlled on a continuous basis. Methods and means of maintaining level control is described in detail in U.S. Pat. No. 5,076,908.

To assure that plug-like flow continues throughout the full length of the bed, and particularly at the bottom portion, the catalyst support structure is particularly characterized by the conical configuration of the conical support member 26. Plug-like flow of the packed catalyst bed is further achieved by selecting the average density, size, and shape of the catalytic particulates forming the bed so that the bed expands by less than 10% at the maximum anticipated fluid flow velocities of the vapor and liquid components therethrough. The catalyst employed in the hydroprocess broadly comprises a size range or size distribution such that at least about 90% by weight, preferably at least about 95% by weight, more preferably, at least about 97% by weight, of the catalytic particulates in the catalyst bed 10 have a diameter ranging from $R_1$ to $R_2$, wherein: (i) $R_1$ has a value ranging from about $\frac{1}{64}$ inch (i.e. the approximate opening size of a 35 mesh Tyler screen) to about $\frac{1}{4}$ inch (i.e. the approximate opening size of a 3 mesh Tyler screen); (ii) $R_2$ also has a value ranging from about $\frac{1}{64}$ inch (i.e. the approximate opening size of a 35 mesh Tyler screen) to about $\frac{1}{4}$ inch (i.e. the approximate opening size of a 3 mesh Tyler screen); and (iii) the ratio $R_2/R_1$ has a value greater than or equal to about 1 and less than or equal to about 1.4 (or about the square root of 2.0). Further, the catalyst preferably is a spherical catalyst having a uniform density ranging from about 0.7 g/cc to about 3.0 g/cc.

Desirably such movement and bed level of such catalyst is continuously monitored to prevent overfilling and to assure minimum ebulation and attendant wastage of reactor space and particle size segregation. Uniformity of gas flow is maintained across the cross-sectional area of the vessel and the full volume of the bed so as to avoid ebulation of the bed, including eddy currents or localized recirculation, of catalytic particulates moving downwardly in plug-like flow through the vessel. Preferably the gaseous component of the feed stream is uniformly distributed through a plurality of annular concentric rings or polygons, serving as baffles abutting the lower surface of a conical support member to form a plurality of pairs of connected annular gas pockets and adjacent concentric liquid annular feed rings between each adjacent pairs of annular supports. Thus, the catalyst bed is provided with uniformly concentric annular and alternate feed rings of both liquid and gas across the full cross-sectional area of the downwardly flowing catalyst bed.

A catalyst withdrawal conduit 29, indicated in FIG. 4, is provided such that its inlet is located adjacent to and above the bottom plate 25 to facilitate catalyst draw-off from the support structure. A preferred catalyst withdrawal conduit is the inverted J-tube, described fully in U.S. Pat. Nos. 5,076,908; 5,302,357 and 5,098,230, the entire disclosures of which are incorporated herein by reference. Specifically, the inverted J-tube is a catalyst withdrawal conduit having an inlet opening generally downwardly in reactor vessel 11 adjacent to and above the central portion (bottom plate 25) of the conical support member, and comprising a first section 224 extending upwardly from said inlet, and a second section 225 extending downwardly out of vessel 11, wherein the ratio of the volume of the first section to the total volume of the conduit is less than 0.1.

Preferably, the present invention relates to methods and apparatus for on-stream replacement of catalyst without local levitation or ebulation of catalytic particulates around the withdrawal point within the catalyst bed by laminarly flowing a liquid hydrocarbon stream either into, or out of, reactor vessel 11 through a pair of flow paths 19 and 29. Each of the flow paths has a substantially constant cross-sectional area throughout its length and a diameter at least five times the average diameter of the catalytic particulates flowing between said vessel and at least one and preferably two, pressurizable catalyst lock-hoppers or receptacles 60 and 80, serving respectively to supply fresh catalyst to the top of the bed 20 and to remove spent catalyst from the bottom. Further, each flow path includes at least one in-line control valve 64 and 84 having a through-bore of substantially the same diameter as the flow path and at least one auxiliary fluid flow path 69 and 87 for introducing fluid flow into the slurry path for flushing catalytic particulates from the path. Preferably the flush fluid is a liquid, and selectively, by reverse hydrogen flow through the line when catalyst is not being moved, particles are blocked from entering the flow path and coking is prevented at the entry to the flow tube. The hopper vessels 60 and 80 are selectively pressurizable as required to induce such laminar flow of liquid-entrained catalyst to feed replacement catalyst into the upper end of reactor vessel 11 and to withdraw spent catalyst from the lower end of the vessel. Desirably, each of the flow paths is characterized by an inverted J-tube 29, 71, 86, 96 and 108, which includes an inlet portion for the liquid stream and entrained catalyst having a reverse upward flow section substantially shorter than the downward flow path. Preferably, in reactor vessel 11 the inlet portion for withdrawing catalyst is disposed above an imperforate central portion 25 of the conical catalyst support member 17, so that such catalyst withdrawal position is adjacent the bed bottom, but substantially out of the concentric feed path for upwardly flowing liquid hydrocarbon feed and gas streams. This avoids gas entrainment with the catalyst slurry, as by ebulation of the bed around the intake point. From the foregoing summary it will be apparent that several significant factors contribute directly to efficient use of a given process vessel to assure non-ebulating, plug-like flow of a body of catalytic particulates while being contacted by a counter-flowing hydrocarbon fluid stream of vapor and liquid therethrough at maximum space-velocity. Among such significant factors are 1.) the size, volume and density characteristics of such particles at preselectable flow velocities and pressures of the hydrocarbon fluid stream; 2.) control of bed ebulation and/or levitation during hydrocarbon fluid flow; 3.) laminar flow of the catalytic particulates during movement into and out of the moving bed for replacement or regeneration without bed ebulation or levitation; 4.) concentric annular feed of alternate rings of the gas and liquid components of the hydrocarbon feed uniformly into the full moving catalyst bed which is capable of recovering promptly from upset or pressure changes in the vessel to restore such alternate rings of gas and liquid over process runs of extended length (e.g. several thousand hours); and 5.) redistribution of the gas components along the axial length of the moving bed.

The hydroconversion process in which the catalyst support structure may be used include hydrocracking, hydrodemetalation, hydrotreating, hydrodesulfurization, hydrodenitrification, hydrofinishing and the like, all of which catalytically upgrade a heavy hydrocarbonaceous oil that represents the liquid hydrocarbon stream or liquid hydrocarbon feed stream. By "heavy" liquid hydrocarbon stream, as used herein, is meant liquid hydrocarbon stream at least 50 volume percent of which boils above about 204° C. and which preferably contains a substantial fraction boiling above about 343° C. and particularly preferably above about 510° C. Preferred liquid hydrocarbon streams are residual fractions and synthetic crudes. They can be derived from crude petroleum, from coal, from oil shale, from tar sand bitumen, from heavy tar oils, and from other synthetic sources.

Catalytic upgrading conditions (e.g. catalytic desulfurization conditions, catalytic hydrogenation conditions such as designed for asphaltenes saturation, catalytic denitrification conditions and catalytic hydrocracking conditions, etc.) employed in the hydroconversions reaction zones within the reactor vessel 11 for preferred embodiments of the present invention all include a reaction temperature generally in the range of from about 230° C. to about 480° C., a pressure generally in the range of from about 30 to about 300 atmospheres, a hydrogen rate ranging from about 1000 to about 10,000 standard cubic feet per barrel of feed, and a liquid hourly space velocity (LHSV) in the range of from about 0.20 h-1 to about 10 h-1. For feed demetalation upgrading, the temperatures and pressures within the reaction zone can be those typical for conventional demetalation processing. The pressure is typically above about 500 psig (514.7 psia; 35.5 bar). The temperature is typically greater than about 315° C., and preferably above 371° C. Generally, the higher the temperature, the faster the metals are removed, but the higher the temperature, the less efficiently the metals loading capacity of the demetalation catalyst is used. While demetalation reaction can be conducted in the absence of added hydrogen, hydrogen is generally used and therefore requires full and equal distribution into the moving bed along with any gases evolving from the feed.

EXAMPLE 1

The following is a design example of the supporting structure according to the present invention:

| | |
|---|---|
| Inside diameter of reactor | 4,400 mm |
| Weight of catalyst in reactor | 220 metric ton |
| Angle α | 60° |
| Diameter of bottom plate | 1,066 mm |
| Thickness of perforated plate | 22 mm in lower portion of side wall |
| | 28 mm in upper portion side wall |
| Diameter × Pitch of hole | 50 mm × 75 mm |
| First woven mash layer | metal wire netting having diameter 6 mm, pitch 10 mm |
| Second woven mash layer | metal wire netting having diameter 1.6 mm, 9 × 9 mesh |
| Total weight of supporting structure | approximately 11 ton |

EXAMPLE 2

Dimensions of a conventional beam supporting structure design based on the same design conditions as in Example 1 are as follows:

| | |
|---|---|
| Beams | 8 solid pieces of 330 mm high, and 150 mm wide |
| Transverse member traversing | a number of plate members |

| | |
|---|---|
| beams | of 300 mm high, and 38 mm thick |
| Total weight of supporting structure | approximately 32 ton |

Comparing Example 1 with Example 2, the wide beams in the conventional supporting structure tends to hinder fluid flow into the catalyst bed, thereby causing uneven and non-uniform distribution of fluids in the bed, the large perforations in the support structure of this invention provide much more uniform fluid flow. Increasing fluid flow using the conventional support structure increases pressure drop and increases power consumption to a much greater extent than when the fluid flow is increased through the support structure of this invention, since the perforations in the present support structure can be designed independent of other design parameters, such as required strength of the support structure.

The weight of the support structure of this invention may be as low as approximately 35% of the conventional structure. Material cost reductions are of the same magnitude. Since the thickness of the skirt supporting the reactor body can be reduced due to the weight reduction of the supporting structure, the material cost will be further reduced. And, since the construction of the present structure requires fewer complex operations than with the conventional structure, the manpower required for fabrication and installation may also be reduced by up to approximately 30%.

EXAMPLE 3

The following is another design example of the support structure according to the present invention:

| | |
|---|---|
| Inside diameter of reactor | 4,400 mm |
| Weight of catalyst in reactor | 220 metric ton |
| Angle α | 60° |
| Diameter of bottom plate | 1,066 mm |
| Thickness of perforated plate | 22 mm in lower portion of side wall |
| | 28 mm in upper portion of side wall |
| Diameter × Pitch of hole | 50 mm × 75 mm |
| Screen welded to perforated plate | Johnson Filtration Systems Vee-Wire Sharp Series Screen vith #93 Vee-Wire separated by 0.05 inch slots on #156 circular rod on ¾ inch centers. (0.090 inch wire width and 0.140 inch wire height with 13° relief angle) |
| Total weight of supporting structure | approximately 11 ton |

What is claimed is:

1. A catalyst support structure for use in a substantially cylindrically-shaped reactor containing a catalyst bed comprising:

a. a perforated conical support member diverging upwardly and having a truncated conical shape truncated by a bottom plate; and b. at least one upper flow guide abutting an upper surface of said conical support member and extending upwardly and having a height above the conical support member sufficient to direct fluid flow upwardly into a catalyst bed, said upper flow guide forming a continuous, generally circular structure concentric with the bottom plate for reducing the migration of a fluid charge along the upper surface of the conical support member.

2. The catalyst support structure of claim 1 wherein the conical support member is a cone-shaped plate having a plurality of holes distributed over the surface of said conical support member sufficient in size to permit passage of an ascending stream of fluid and wherein said upper flow guide comprises a plurality of rings of different diameters coaxial with said bottom plate and concentrically positioned above and abutting the cone-shaped plate.

3. The catalyst support structure of claim 2 wherein the bottom plate is substantially circular and is positioned perpendicular to a center line of the reactor.

4. The catalyst support structure of claim 3 wherein the bottom plate is imperforate.

5. The catalyst support structure of claim 3 wherein the bottom plate includes a perforated portion.

6. The catalyst support structure of claim 5 wherein the perforated portion of the bottom plate is overlaid with at least one bottom plate screen member, said perforated portion of said bottom plate having holes of a size sufficient to permit the passage of catalytic particulates through the bottom plate, and said bottom plate screen member having perforations of a size to prevent passage of catalytic particulates through said bottom plate screen member.

7. The catalyst support structure of claim 2 further comprising at least one screen member overlaying said conical support member, said screen member having perforations of a size to prevent passage of catalytic particulates through said screen member but sufficient to permit passage of an ascending stream of fluid.

8. The catalyst support structure of claim 7 comprising a first woven mesh layer overlaying said perforated conical support member and further comprising a second woven mesh layer overlaying the first woven mesh layer, wherein the second woven mesh layer has openings small enough to prevent passage of catalytic particulates through said second woven mesh layer.

9. The catalyst support structure of claim 7 wherein each screen member is positioned between adjacent upper flow guides.

10. The catalyst support structure of claim 7 wherein the screen member is attached to an upper surface of said perforated conical support member, the attachment serving as the upper flow guide.

11. The catalyst support structure of claim 10 wherein said attachment is a weld.

12. The catalyst support structure of claim 2 further comprising a plurality of substantially concentric, cylindrical lower flow guides abutting the lower surface of the conical support member and extending downwardly, the lower flow guides being radially spaced apart from each other to form a plurality of concentric annular rings, each of the lower flow guides being coaxial with the bottom plate.

13. The catalyst support structure of claim 12 wherein said reactor has a diameter in the range of 3 meters to 8 meters.

14. A catalyst support structure for supporting a moving bed of catalytic particulates within a substantially cylindrically-shaped reactor having an upwardly flowing fluid phase, said support structure comprising:

a. a perforated conical support member diverging upwardly and having a truncated conical shape, truncated by a circular bottom plate, wherein the conical support member is a cone-shaped plate having a plurality of holes distributed over the surface of said perforated conical support member sufficient in size to permit passage of an ascending stream of fluid; and b. a screen member comprising a plurality of longitudinal rod members spaced transversely upon bearing rod members, said screen member overlaying and attached to said conical support member by at least one continuous, generally circular bond between the upper surface of the conical support member and the screen, for reducing the migration of a fluid charge along the upper surface of the conical support member.

15. The catalyst support structure of claim 14 further comprising a plurality of substantially concentric, cylindrical lower flow guides abutting the lower surface of the conical support member and extending downwardly, the lower flow guides being radially spaced apart from each other to form a plurality of concentric annular rings, each of the lower flow guides being coaxial with the bottom plate.

16. A catalyst support structure according to claim 14 wherein the circular bond is a weld string.

17. A process for reacting a hydrocarbon fluid charge comprising:

a. introducing a first portion of catalytic particulates into an upper portion of a reaction zone containing a moving bed of catalytic particulates supported on a catalyst support structure within a substantially cylindrically shaped reactor;

b. withdrawing a second portion of catalytic particulates from a lower portion of said reaction zone;

c. introducing a fluid charge comprising hydrocarbon and hydrogen through the catalyst support structure into a lower portion of said reaction zone; and d. withdrawing converted hydrocarbons from an upper portion of said reaction zone;

wherein the catalyst support structure comprises a perforated conical support member diverging upwardly and having a truncated conical shape, said shape being truncated by a bottom plate; and at least one upper flow guide abutting said conical support member extending upwardly and having a height above the conical support member sufficient to direct fluid flow upwardly into a catalyst bed, said upper flow guide forming a continuous, generally circular structure concentric with the bottom plate for reducing the migration of a fluid charge along an upper surface of the conical support member.

18. The process of claim 17 wherein the bottom plate is imperforate.

19. The process of claim 17 wherein the conical support member is a cone-shaped plate having a plurality of holes distributed over the surface of said perforated conical support member sufficient in size to permit passage of an ascending stream of fluid and wherein said upper flow guide comprises a plurality of rings of different diameters coaxial with said bottom plate and concentrically positioned above and abutting the cone-shaped plate, and wherein the bottom plate is substantially circular and is positioned perpendicular to a center line of the reactor.

20. The process of claim 19 where the catalyst support structure further comprises at least one screen member overlaying said conical support member, said screen member having perforations of a size to prevent passage of catalytic particulates through said screen member but sufficient to permit passage of an ascending fluid phase, and wherein said screen member is attached to the upper surface of the perforated conical support member, the attachment serving as the upper flow guide.

21. The process of claim 20 wherein the catalyst support structure further comprises a plurality of substantially concentric, cylindrical lower flow guides abutting the lower surface of the conical support member and extending downwardly, the lower flow guides being radially spaced apart from each other to form with the conical support member a plurality of concentric annular rings, each of the lower flow guides being coaxial with the bottom plate, and wherein said reactor has a diameter in the range of 3 meters to 8 meters.

* * * * *